(12) United States Patent
Pitts et al.

(10) Patent No.: US 6,983,778 B1
(45) Date of Patent: Jan. 10, 2006

(54) ROAD GRIPPING ASSEMBLY

(76) Inventors: Freddie L. Pitts, 1121 N. Kildare, Chicago, IL (US) 60651; Gerald L. Pitts, 1121 N. Kildare, Chicago, IL (US) 60651

( * ) Notice: Subject to any disclaimer, the term of this patent is extended or adjusted under 35 U.S.C. 154(b) by 47 days.

(21) Appl. No.: 10/681,295

(22) Filed: Oct. 9, 2003

(51) Int. Cl.
 *B60C 11/03* (2006.01)
(52) U.S. Cl. .............. 152/225 R; 152/216; 301/41.1; 301/51
(58) Field of Classification Search ............ 152/225 R, 152/216, 218, 217, 226, 213 R; 301/41.1, 301/42, 43, 44.1, 45, 46, 51
See application file for complete search history.

(56) References Cited

U.S. PATENT DOCUMENTS

| | | | | |
|---|---|---|---|---|
| 1,327,538 A | * | 1/1920 | Etter | 152/216 |
| 2,212,076 A | * | 8/1940 | Rollings | 152/216 |
| 2,598,298 A | | 5/1952 | Pindjak | |
| 2,837,133 A | * | 6/1958 | Armenante et al. | 152/218 |
| 3,112,784 A | * | 12/1963 | Montenare | 301/47 |
| 3,854,514 A | | 12/1974 | Edwards | |
| 4,089,359 A | * | 5/1978 | Jones | 152/216 |
| 4,735,248 A | | 4/1988 | Cizaire | |
| 4,747,438 A | * | 5/1988 | Joung | 152/228 |
| 5,033,522 A | | 7/1991 | Metraux | |
| 5,540,267 A | | 7/1996 | Rona | |
| 6,053,227 A | | 4/2000 | Robeson | |

* cited by examiner

*Primary Examiner*—Frantz F. Jules

(57) ABSTRACT

A road gripping and traction assembly includes an assembly that is removably positionable on a vehicle wheel that includes a rim having a plurality of threaded bolts extending therethrough. The assembly includes a hub having an inner surface, an outer surface and a peripheral edge. The hub has a plurality of apertures extending therethrough. The number of apertures equals the number of threaded bolts. Each of the apertures is positioned for selectively receiving one of the threaded bolts. A plurality of arms each have an attached end that is attached to the peripheral edge and a free end extending outwardly away from the hub. Each of a plurality of gripping members is pivotally coupled to one of the free ends such that the gripping members are selectively positionable in a stored positioned adjacent to a side wall of the wheel or in a gripping position abutting threads of the wheel.

10 Claims, 5 Drawing Sheets

ROAD GRIPPING ASSEMBLY

BACKGROUND OF THE INVENTION

1. Field of the Invention

The present invention relates to wheel grip enhancing devices and more particularly pertains to a new wheel grip enhancing device for increasing the traction of vehicle wheels.

2. Description of the Prior Art

The use of wheel grip enhancing devices is known in the prior art. U.S. Pat. No. 4,747,438 describes a device that includes gripping claws which are positionable on vehicle wheels for increasing traction on road surfaces. Another type of wheel grip enhancing device is U.S. Pat. No. 5,540,267 having gripping members which are extendable over the edge of wheel and include tension springs for retaining the device on the wheel. U.S. Pat. No. 6,053,227 describes a collection of gripping members attached together by a winch so that the gripping members may be fitted to varying sized wheels when needed.

While these devices fulfill their respective, particular objectives and requirements, the need remains for a device that may be attached to the rim of a vehicle with the vehicles lugs so that the device may be retained on the vehicle in a stored position until it is needed at which time arms of the device are extendable for positioning gripping members on the wheels of the vehicle. Such a device should also be able to be safely used on residential streets without damaging the pavement.

SUMMARY OF THE INVENTION

The present invention meets the needs presented above by including a central hub having a plurality of arms extending outwardly therefrom. Gripping members are attached to the arms. The hub is attachable to wheel rim by the vehicle's lugs and the arms are telescoping for allowing variance in wheel size and to allow positioning of gripping members in either a stored positioned adjacent to a side wall of the wheel or in a gripping position abutting treads of the wheel.

Another object of the present invention is to provide a new wheel grip enhancing device that includes gripping members having elastomeric coatings thereon which will provide additional traction because they are raised upwardly from the wheel while the elastomeric coatings prevent damage to pavement.

Still another object of the present invention is to provide a new wheel grip enhancing device that is easily retrofittable to existing vehicles.

To this end, the present invention generally comprises an assembly that is removably positionable on a vehicle wheel that includes a rim having a plurality of threaded bolts extending therethrough. The assembly includes a hub having an inner surface, an outer surface and a peripheral edge. The hub has a plurality of apertures extending therethrough. The number of apertures equals the number of threaded bolts. Each of the apertures is positioned for selectively receiving one of the threaded bolts. A plurality of arms each have an attached end that is attached to the peripheral edge and a free end extending outwardly away from the hub. Each of a plurality of gripping members is pivotally coupled to one of the free ends such that the gripping members are selectively positionable in a stored positioned adjacent to a side wall of the wheel or in a gripping position abutting threads of the wheel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
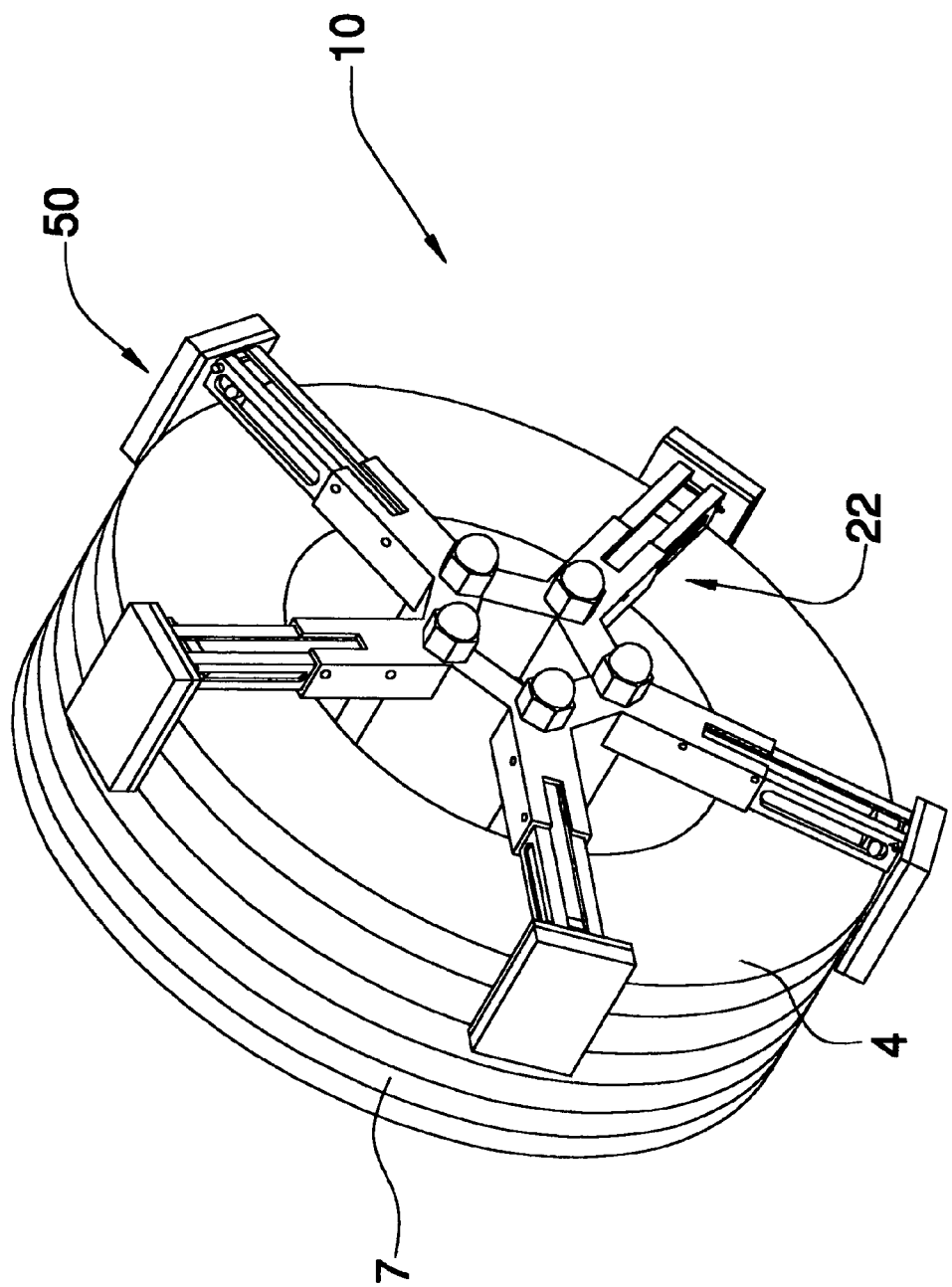
FIG. 1 is a schematic perspective view of a road gripping assembly according to the present invention.
Figure 2:
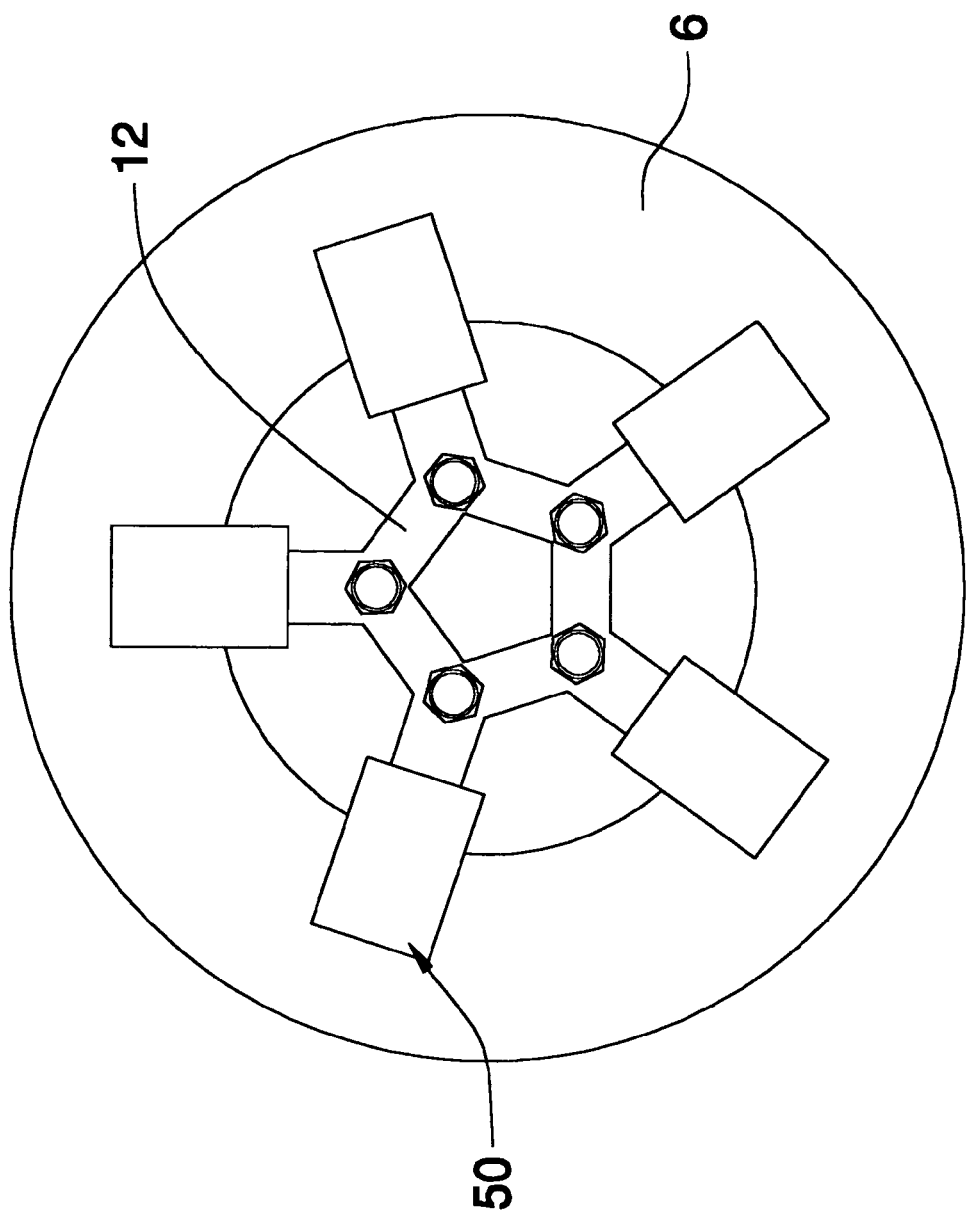
FIG. 2 is a schematic front view of the present invention.

With reference now to the drawings, and in particular to FIGS. 1 through 5 thereof, a new wheel grip enhancing device embodying the principles and concepts of the present invention and generally designated by the reference numeral 10 will be described.

As best illustrated in FIGS. 1 through 5, the road gripping assembly 10 generally comprises an assembly for removably positioning on a vehicle wheel 4. The vehicle wheel 4 includes a rim that has a plurality of threaded bolts 5, or lugs, extending therethrough. The assembly includes a hub 12 has an inner surface 14, an outer surface 16 and a peripheral edge 18. The hub 12 has a plurality of apertures 20 extending therethrough. The number of apertures 20 equals the number of threaded bolts 5. Each of the apertures 20 is positioned for selectively receiving one of the threaded bolts 5. The plurality of apertures 20 is preferably five apertures.

Each of a plurality of arms 22 has an attached end 24 that is attached to the peripheral edge 18 and a free end 26 extending outwardly away from the hub 12. The plurality of arms 22 preferably includes five arms 22 that are generally spaced equidistant from each other. Each of the arms 22 is selectively telescoping and includes a first portion 28, a second portion 30 and a lock pin 32. The first portion 28 is fixedly coupled to the hub 12 and has a longitudinal axis radially extending outwardly from the hub 12. The first portion 28 has a plurality of openings 34 extending therethrough that are orientated perpendicular to the longitudinal axis.

The second portion 30 has a first end 36 and a second end 38. The first end 36 is positioned within a well 40 extending into an outer end of the first portion 22 such that a longitudinal axis of the second portion 30 is aligned with the longitudinal axis of the first portion 28. The second portion 30 is selectively positionable in a retracted positioned or an extended position with respect to the first portion 28. At least one protuberance 41 is positioned on an outer surface of the second portion 30. The at least one protuberance 41 is positioned within an elongated slot 42 positioned in an inner wall of the first portion 28. The slot 42 is orientated parallel to the longitudinal axis of the first portion. Preferably, the second portion 30 includes a pair of protuberances 41 extending in opposite directions with respect to each other and each is in its own slot 42. The protuberance 41 is positioned generally adjacent to the first end 36 and prevents the second portion 30 from extending completely outwardly from the first portion 28. The second portion 30 has at least one pair of openings 44, 46 extending therethrough. Each of the openings 44, 46 in the second portion is selectively alignable with the openings 34 in the first portion 28. A first of the openings 44 in the second portion 30 is preferably positioned generally adjacent to the second end 38 of the second portion 30 for reasons which will become clear below.

The lock pin 32 is selectively extendable through aligned pairs of the openings 34, 44, 46 in the first 28 and second 30 portions. The lock pin 32 preferably has a hole 48 extending therethrough for receiving a cotter pin 49, or the lock pin 32 may include an outwardly biased ball for ensuring that the lock pin 32 is not easily dislodged from the openings.

Figure 3:
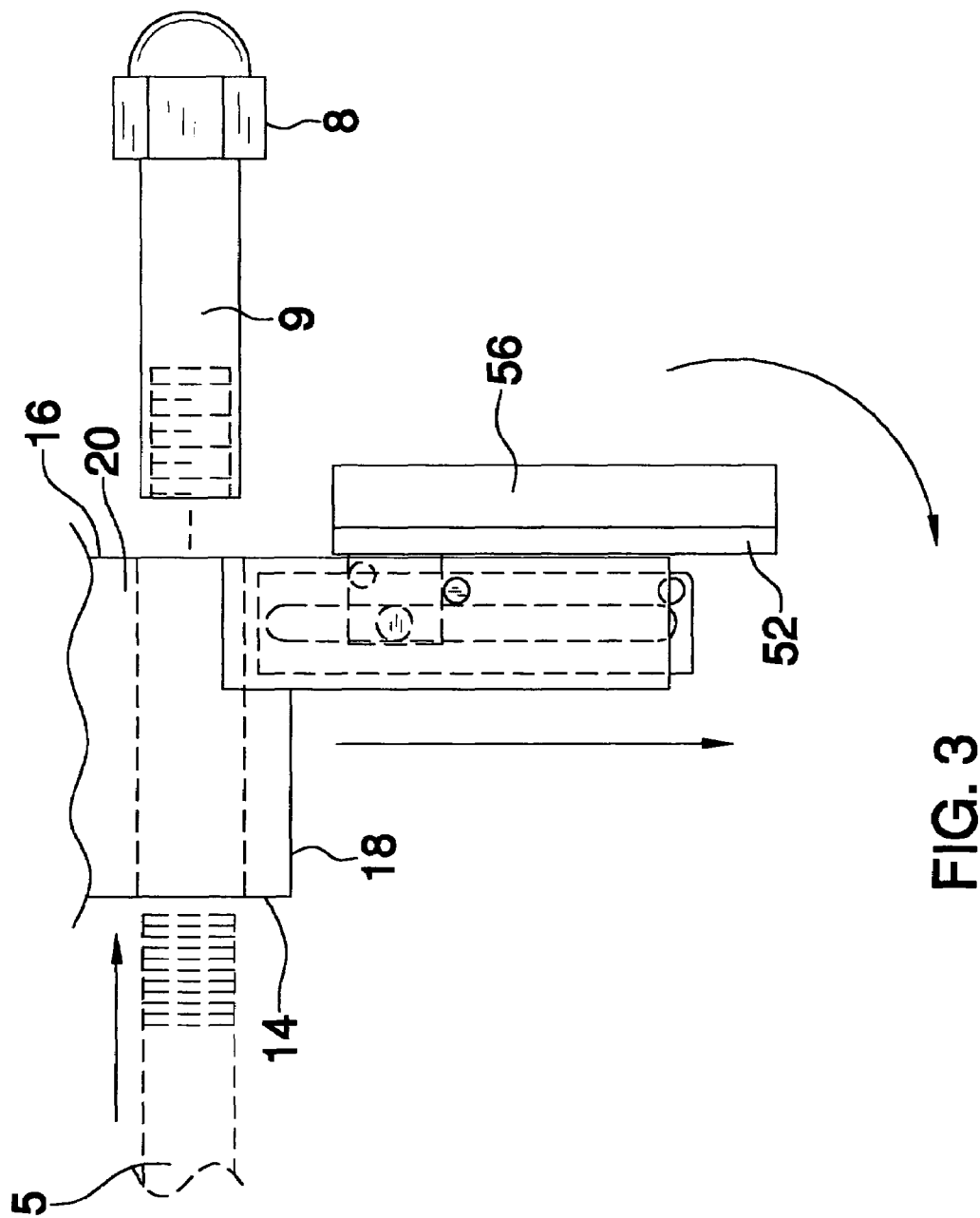
FIG. 3 is a schematic side view of the present invention.
Figure 4:
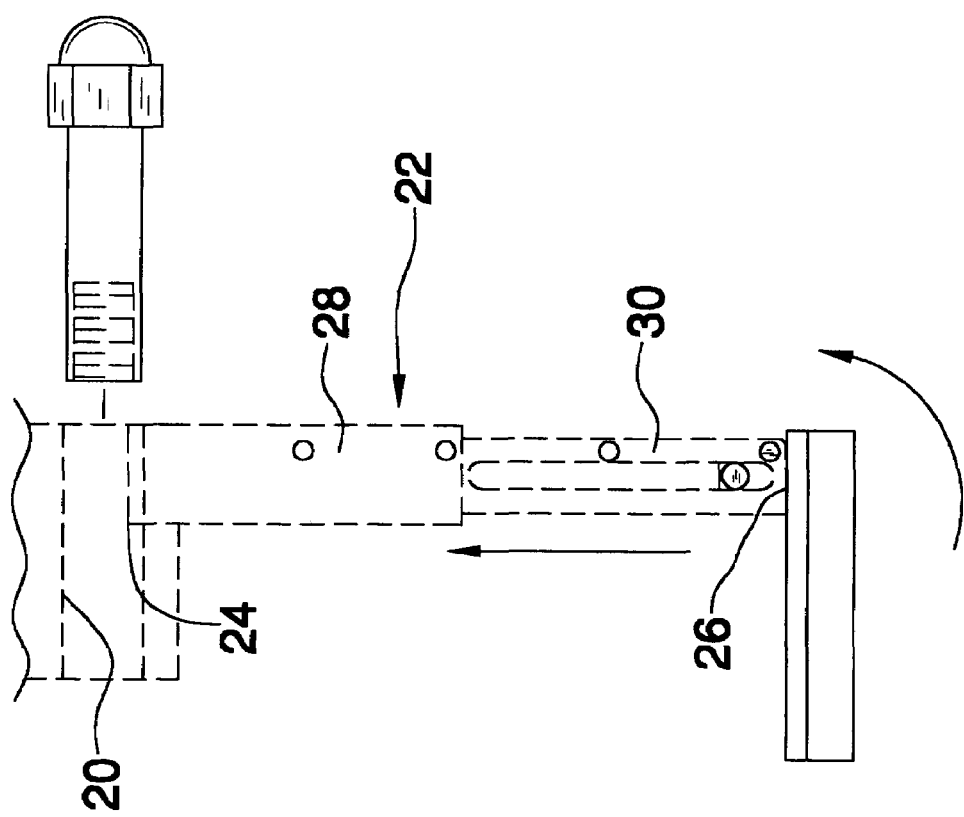
FIG. 4 is a schematic side view of the present invention.
Figure 5:
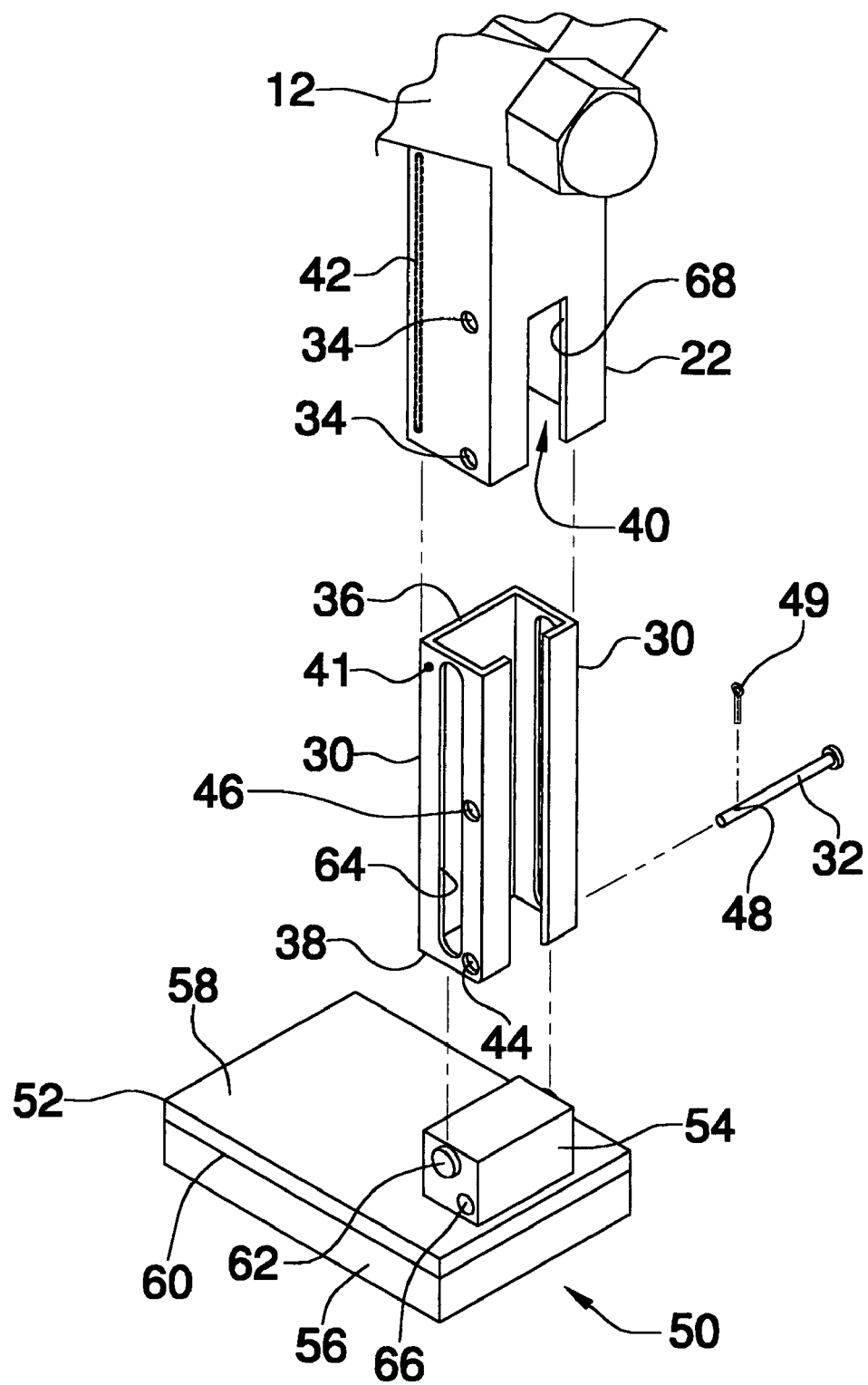
FIG. 5 is a schematic perspective expanded view of the present invention.

Each of a plurality of gripping members 50 is pivotally coupled to one of the free ends 26 such that the gripping members 50 are selectively positionable in a stored positioned adjacent to a side wall 6 of the wheel 4 (FIG. 2) or in a gripping position positioned abutting threads 7 of the wheel 4 (FIG. 1). Each of the gripping members 50 includes a plate 52, a coupler 54 and a coating 56 positioned on the plate 52. The plate 52 has a first side 58 and a second side 60. The coupler 54 is attached to the first side 58 and is pivotally coupled to the second portion 30. The coupler 54 is selectively movable between the first 36 and second 38 ends of the second portion. This is accomplished by knob 62 on the coupler 60 which is rotatably and slidably mounted in a channel 64 positioned in the second portion 30. A cavity 66 extends through the coupler 54. The cavity 66 is selectively alignable with the first opening 44 in the second portion 30. The lock pin 32 may be extended through the first opening 44 in the second portion and through the cavity 66 for selectively locking the plate 52 in the gripping position such that the first side 58 is abutting the treads 7. In the stored position, the lock pin 32 is extended through aligned openings 34 and 44, 46 such that the coupler 54 is positioned between the lock pin 32 and the first end 36 of the second portion 30 and consequently within the first portion 28. The knob 62 is positioned such that first side 58 of the plate 52 abuts the arm 22 when the second portion 30 is in the retracted position as shown in FIG. 3. A slot 68 in the first portion 28 facilitates the movement of the coupler 54 into the first portion 28. The coating 56 is an elastomeric coating that is attached to and substantially covers the second side 60 of the plate 52.

In use, the hubcap of the wheel 4 is removed from a wheel to expose the lugs 5 and lug nuts 8. The hub 12 of the assembly 10 is positioned on the lugs 5 and the lug nuts 8 are used to secure it in place on the wheel 4. Depending on the thickness of the hub 12 of the assembly 10, elongated lug nuts, as shown in FIG. 3, may need to be used which include a rod 9 that extends through the apertures 20 and threadably receives the lugs 5. During times of poor road conditions, the gripping members 40 are moved to a position over the threads 7. Since they are raised over the threads 7, the gripping members 50 provide additional traction so that the user may become unstuck from a snowed in position. The assembly may also be used in muddy conditions. Because the plates 52 have an elastomeric coating 56 thereon, they do not cause the type of damage to pavement that is associated with chains.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A road gripping assembly for removably positioning on a vehicle wheel, the vehicle wheel including a rim having a plurality of threaded bolts extending therethrough, said assembly including:

a hub having an inner surface, an outer surface and a peripheral edge, said hub having a plurality of apertures extending therethrough, wherein the number of apertures equals the number of said threaded bolts, each of said apertures being positioned for selectively receiving one of said threaded bolts;

a plurality of arms each having an attached end being attached to said peripheral edge and a free end extending outwardly away from said hub, each of said arms being selectively telescoping, each of said arms including:

a first portion fixedly coupled to said hub, said first portion having a longitudinal axis radially extending outwardly from said hub, said first portion having a plurality of openings extending therethrough and orientated perpendicular to said longitudinal axis;

a second portion having a first end and a second end, said first end being positioned within a well extending into an outer end of said first portion such that a longitudinal axis of said second portion is aligned with said longitudinal axis of said first portion, said second portion being selectively positionable in a retracted position or an extended position, said second portion having at least one pair of openings extending therethrough, each of said openings in said second portion being selectively alignable with said openings in said first portion, a lock pin being selectively extendable through aligned pairs of said openings in said first and second portions; and a plurality of gripping members, each of said gripping members being pivotally coupled to one of said free ends such that said gripping members are selectively positionable in a stored position adjacent to a side wall of the wheel or in a gripping position abutting threads of the wheel.

2. The road gripping assembly of claim 1, wherein said plurality of arms are spaced generally equidistant from each other.

3. The road gripping assembly of claim 2, wherein said plurality of arms includes five arms.

4. The road gripping assembly of claim 1, further including at least one protuberance being positioned on an outer surface of said second portion, said at least one protuberance being positioned within an elongated slot positioned in an inner wall of said first portion, said slot being orientated parallel to said longitudinal axis of said first portion, said protuberance being positioned generally adjacent to said first end.

5. The road gripping assembly of claim 1, wherein a first of said openings in said second portion is positioned generally adjacent to said second end of said second portion, each of said gripping members includes:
   a plate having a first side and a second side; and
   a coupler being attached to said first side and being pivotally coupled to said second portion, wherein said lock pin may be extended through one of said openings in said second portion and through a cavity extending through the coupler for selectively locking said plate in said gripping position such that said first side is abutting the treads.

6. The road gripping assembly of claim 5, wherein said coupler is selectively movable between said first and second ends of said second portion.

7. The road gripping assembly of claim 6, further including an elastomeric coating being attached to and substantially covering said second side of said plate.

8. The road gripping assembly of claim 6, wherein said plurality of arms includes at least five arms positioned generally equidistant from each other.

9. The road gripping assembly of claim 5, further including an elastomeric coating being attached to and substantially covering said second side of said plate.

10. A road gripping assembly for removably positioning on a vehicle wheel, the vehicle wheel including a rim having a plurality of threaded bolts extending therethrough, said assembly including:
   a hub having an inner surface, an outer surface and a peripheral edge, said hub having a plurality of apertures extending therethrough, wherein the number of apertures equals the number of said threaded bolts, each of said apertures being positioned for selectively receiving one of said threaded bolts, wherein said plurality of apertures is five apertures;
   a plurality of arms each having an attached end being attached to said peripheral edge and a free end extending outwardly away from said hub, said plurality of arms being spaced generally equidistant from each other, said plurality of arms being five arms, each of said arms being selectively telescoping and including:
      a first portion fixedly coupled to said hub, said first portion having a longitudinal axis radially extending outwardly from said hub, said first portion having a plurality of openings extending therethrough and orientated perpendicular to said longitudinal axis;
      a second portion having a first end and a second end, said first end being positioned within a well extending into an outer end of said first portion such that a longitudinal axis of said second portion is aligned with said longitudinal axis of said first portion, said second portion being selectively positionable in a retracted position or an extended position, at least one protuberance being positioned on an outer surface of said second portion, said at least one protuberance being positioned within an elongated slot positioned in an inner wall of said first portions, said slot being orientated parallel to said longitudinal axis of said first portion, said protuberance being positioned generally adjacent to said first end, said second portion having a pair of openings extending therethough, each of said openings in said second portion being selectively alignable with said openings in said first portion, a first of said openings in said second portion being positioned generally adjacent to said second end of said second portion;
      a lock pin being selectively extendable through aligned pairs of said openings in said first and second portions;
   a plurality of gripping members, each of said gripping members being pivotally coupled to one of said free ends such that said gripping members are selectively positionable in a stored position adjacent to a side wall of the wheel or in a gripping position abutting threads of the wheel, each of said gripping members including;
      a plate having a first side and a second side;
      a coupler being attached to said first side and being pivotally coupled to said second portion, said coupler being selectively movable between said first and second ends of said second portion, a cavity extending through said coupler, said cavity being selectively alignable with said first opening in said second portion, wherein said lock pin may be extended through said first opening in said second portion and through said cavity for selectively locking said plate in said gripping position such that said first side is abutting the treads; and an elastomeric coating being attached to and substantially covering said second side of said plate.

* * * * *